US007983310B2

(12) United States Patent
Hirano et al.

(10) Patent No.: US 7,983,310 B2
(45) Date of Patent: Jul. 19, 2011

(54) METHODS FOR IN-BAND SIGNALING THROUGH ENHANCED VARIABLE-RATE CODECS

(75) Inventors: Michael Hirano, Redmond, WA (US); Kiley Birmingham, San Luis Obispo, CA (US); Lee Zhao, Sammamish, WA (US); David Quimby, Seattle, WA (US)

(73) Assignee: Airbiquity Inc., Seattle, WA (US)

( * ) Notice: Subject to any disclaimer, the term of this patent is extended or adjusted under 35 U.S.C. 154(b) by 238 days.

(21) Appl. No.: 12/252,284

(22) Filed: Oct. 15, 2008

(65) Prior Publication Data

US 2010/0067565 A1      Mar. 18, 2010

Related U.S. Application Data

(60) Provisional application No. 61/097,177, filed on Sep. 15, 2008, provisional application No. 61/101,880, filed on Oct. 1, 2008.

(51) Int. Cl.
 *H04J 3/12* (2006.01)
(52) U.S. Cl. ........ 370/525; 370/320; 370/335; 370/342; 370/441; 370/479; 370/493; 370/494; 455/702; 455/703; 375/134; 375/137; 375/272; 375/275; 375/303; 375/307; 375/334; 375/335
(58) Field of Classification Search .................. 370/320, 370/335, 342, 441, 479, 493, 494, 525, 526; 455/702, 703; 375/134, 137, 272–278, 303–307, 375/334–337
See application file for complete search history.

(56) References Cited

U.S. PATENT DOCUMENTS

| | | | |
|---|---|---|---|
| 3,742,197 A | 6/1973 | Pommerening |
| 3,742,463 A | 6/1973 | Haselwood |
| 3,971,888 A | 7/1976 | Ching |
| 3,984,814 A | 10/1976 | Bailey, Jr. |
| 3,985,965 A | 10/1976 | Field |
| 4,158,748 A | 6/1979 | En |
| 4,218,654 A | 8/1980 | Ogawa et al. |
| 4,310,722 A | 1/1982 | Schaible |
| 4,355,310 A | 10/1982 | Belaigues |
| 4,368,987 A | 1/1983 | Waters |

(Continued)

FOREIGN PATENT DOCUMENTS

CA          2242495          1/2000
(Continued)

OTHER PUBLICATIONS

Alfonso Bilbao, m-Security (Security an dMobile Telephone), Proceedings of the IEEE 35th Ann. 2001, International Carnahan Conf. on Security Technology, Oct. 16-19, 2001.

(Continued)

*Primary Examiner* — Aung S Moe
*Assistant Examiner* — Hoon J Chung
(74) *Attorney, Agent, or Firm* — Stolowitz Ford Cowger LLP

(57) ABSTRACT

Improvements are disclosed for in-band signaling, i.e., transmission of data in a voice channel of a digital wireless network during a voice call session. A family of narrow-band signaling methods is disclosed to successfully pass data-carrying signals through the low-bit rate modes of the EVRC-B vocoder commonly used in CDMA wireless channels. Some embodiments generate a tapered signaling waveform in tandem with another waveform using FSK-modulation. These features can be used in cell phones or other wireless communication devices, including automotive applications.

6 Claims, 2 Drawing Sheets

U.S. PATENT DOCUMENTS

| | | | |
|---|---|---|---|
| 4,494,114 A | 1/1985 | Kaish | |
| 4,494,211 A | 1/1985 | Schwartz | |
| 4,539,557 A | 9/1985 | Redshaw | |
| 4,577,343 A | 3/1986 | Oura | |
| 4,595,950 A | 6/1986 | Loftberg | |
| 4,598,272 A | 7/1986 | Cox | |
| 4,599,583 A | 7/1986 | Shimozono et al. | |
| 4,607,257 A | 8/1986 | Noguchi | |
| 4,630,301 A | 12/1986 | Hohl | |
| 4,641,323 A | 2/1987 | Tsang | |
| 4,651,157 A | 3/1987 | Gray | |
| 4,656,463 A | 4/1987 | Anders et al. | |
| 4,675,656 A | 6/1987 | Narcisse | |
| 4,685,131 A | 8/1987 | Horne | |
| 4,750,197 A | 6/1988 | Denekamp et al. | |
| 4,754,255 A | 6/1988 | Sanders | |
| 4,766,589 A | 8/1988 | Fisher | |
| 4,776,003 A | 10/1988 | Harris | |
| 4,831,647 A | 5/1989 | D'Avello | |
| 4,860,336 A | 8/1989 | D'Avello et al. | |
| 4,914,651 A | 4/1990 | Lusignan | |
| 4,918,425 A | 4/1990 | Greenberg et al. | |
| 4,918,717 A | 4/1990 | Bissonnette et al. | |
| 4,926,444 A | 5/1990 | Hamilton et al. | |
| 4,941,155 A | 7/1990 | Chuang | |
| 4,965,821 A | 10/1990 | Bishop | |
| 4,977,609 A | 12/1990 | McClure | |
| 4,984,238 A | 1/1991 | Watanabe | |
| 5,014,344 A | 5/1991 | Goldberg | |
| 5,025,455 A | 6/1991 | Nguyen | |
| 5,036,537 A | 7/1991 | Jeffers | |
| 5,040,214 A | 8/1991 | Grossberg | |
| 5,043,736 A | 8/1991 | Darnell et al. | |
| 5,081,667 A | 1/1992 | Drori | |
| 5,095,307 A | 3/1992 | Shimura | |
| 5,119,403 A | 6/1992 | Krishnan | |
| 5,119,504 A | 6/1992 | Durboraw, III | |
| 5,134,644 A | 7/1992 | Garton et al. | |
| 5,155,689 A | 10/1992 | Wortham | |
| 5,191,611 A | 3/1993 | Lang | |
| 5,201,071 A | 4/1993 | Webb | |
| 5,203,012 A | 4/1993 | Patsiokas | |
| 5,208,446 A | 5/1993 | Martinez | |
| 5,212,831 A | 5/1993 | Chuang | |
| 5,214,556 A | 5/1993 | Kilbel | |
| 5,218,618 A | 6/1993 | Sagey | |
| 5,223,844 A | 6/1993 | Mansell et al. | |
| 5,227,776 A | 7/1993 | Starefoss | |
| 5,235,633 A | 8/1993 | Dennison et al. | |
| 5,245,634 A | 9/1993 | Averbuch | |
| 5,245,647 A | 9/1993 | Grouffal | |
| 5,272,747 A | 12/1993 | Meads | |
| 5,282,204 A | 1/1994 | Shpancer | |
| 5,289,372 A | 2/1994 | Guthrie et al. | |
| 5,301,353 A | 4/1994 | Borras et al. | |
| 5,301,359 A | 4/1994 | Van Den Heuvel | |
| 5,305,384 A | 4/1994 | Ashby et al. | |
| 5,317,309 A | 5/1994 | Vercellotti et al. | |
| 5,331,635 A | 7/1994 | Ota | |
| 5,333,175 A | 7/1994 | Ariyavisitakul | |
| 5,334,974 A | 8/1994 | Simms | |
| 5,347,272 A | 9/1994 | Ota | |
| 5,363,375 A | 11/1994 | Chuang | |
| 5,363,376 A | 11/1994 | Chuang | |
| 5,365,450 A | 11/1994 | Schuchman et al. | |
| 5,365,577 A | 11/1994 | Davis | |
| 5,379,224 A | 1/1995 | Brown et al. | |
| 5,381,129 A | 1/1995 | Boardman | |
| 5,388,147 A | 2/1995 | Grimes | |
| 5,389,934 A | 2/1995 | Kass | |
| 5,390,216 A | 2/1995 | Bilitza | |
| 5,396,539 A | 3/1995 | Slekys et al. | |
| 5,396,653 A | 3/1995 | Kivari | |
| 5,408,684 A | 4/1995 | Yunoki | |
| 5,410,541 A | 4/1995 | Hotto | |
| 5,410,739 A | 4/1995 | Hart | |
| 5,414,432 A | 5/1995 | Penny et al. | |
| 5,418,537 A | 5/1995 | Bird | |
| 5,420,592 A | 5/1995 | Johnson | |
| 5,422,816 A | 6/1995 | Sprague et al. | |
| 5,428,636 A | 6/1995 | Meier | |
| 5,438,337 A | 8/1995 | Aguado | |
| 5,440,491 A | 8/1995 | Kawano et al. | |
| 5,448,622 A | 9/1995 | Huttunen | |
| 5,450,130 A | 9/1995 | Foley | |
| 5,459,469 A | 10/1995 | Schuchman et al. | |
| 5,461,390 A | 10/1995 | Hoshen | |
| 5,475,864 A | 12/1995 | Hamabe | |
| 5,475,868 A | 12/1995 | Duque-Anton | |
| 5,479,480 A | 12/1995 | Scott | |
| 5,479,482 A | 12/1995 | Grimes | |
| 5,483,549 A | 1/1996 | Weinberg et al. | |
| 5,491,690 A | 2/1996 | Alfonsi | |
| 5,497,149 A | 3/1996 | Fast | |
| 5,504,491 A | 4/1996 | Chapman | |
| 5,506,888 A | 4/1996 | Hayes | |
| 5,509,035 A | 4/1996 | Teidemann, Jr. et al. | |
| 5,510,797 A | 4/1996 | Abraham et al. | |
| 5,513,111 A | 4/1996 | Wortham | |
| 5,515,043 A | 5/1996 | Berard | |
| 5,519,403 A | 5/1996 | Bickley et al. | |
| 5,519,621 A | 5/1996 | Wortham | |
| 5,528,232 A | 6/1996 | Verma et al. | |
| 5,530,701 A | 6/1996 | Stillman | |
| 5,537,458 A | 7/1996 | Suomi et al. | |
| 5,539,810 A | 7/1996 | Kennedy, III et al. | |
| 5,543,789 A | 8/1996 | Behr | |
| 5,544,222 A | 8/1996 | Robinson | |
| 5,544,225 A | 8/1996 | Kennedy, III et al. | |
| 5,546,445 A | 8/1996 | Dennison et al. | |
| 5,550,551 A | 8/1996 | Alesio | |
| 5,551,066 A | 8/1996 | Stillman | |
| 5,555,286 A | 9/1996 | Tendler | |
| 5,557,254 A | 9/1996 | Johnson | |
| 5,559,520 A | 9/1996 | Barzegar et al. | |
| 5,565,858 A | 10/1996 | Guthrie | |
| 5,566,173 A | 10/1996 | Steinbrecher | |
| 5,572,204 A | 11/1996 | Timm et al. | |
| 5,576,716 A | 11/1996 | Sadler | |
| 5,587,715 A | 12/1996 | Lewis | |
| 5,590,396 A | 12/1996 | Henry | |
| 5,594,425 A | 1/1997 | Ladner et al. | |
| RE35,498 E | 4/1997 | Barnard | |
| 5,619,684 A | 4/1997 | Goodwin | |
| 5,621,388 A | 4/1997 | Sherburn et al. | |
| 5,625,668 A | 4/1997 | Loomis et al. | |
| 5,627,517 A | 5/1997 | Theimer et al. | |
| 5,630,206 A | 5/1997 | Urban et al. | |
| 5,640,444 A | 6/1997 | O'Sullivan | |
| 5,650,770 A | 7/1997 | Schlager et al. | |
| 5,663,734 A | 9/1997 | Krasner | |
| 5,666,357 A | 9/1997 | Jangi | |
| 5,668,803 A | 9/1997 | Tymes | |
| 5,673,305 A | 9/1997 | Ross | |
| 5,680,439 A | 10/1997 | Aguillera et al. | |
| 5,686,910 A | 11/1997 | Timm et al. | |
| 5,687,215 A | 11/1997 | Timm et al. | |
| 5,687,216 A | 11/1997 | Svensson | |
| 5,691,980 A | 11/1997 | Welles, II et al. | |
| 5,703,598 A | 12/1997 | Emmons | |
| 5,711,013 A | 1/1998 | Collett et al. | |
| 5,712,619 A | 1/1998 | Simkin | |
| 5,712,899 A | 1/1998 | Pace | |
| 5,724,243 A | 3/1998 | Westerlage et al. | |
| 5,726,893 A | 3/1998 | Schuchman et al. | |
| 5,726,984 A | 3/1998 | Kubler et al. | |
| 5,731,757 A | 3/1998 | Layson | |
| 5,732,326 A | 3/1998 | Maruyama et al. | |
| 5,734,981 A | 3/1998 | Kennedy, III et al. | |
| 5,742,233 A | 4/1998 | Hoffman et al. | |
| 5,748,083 A | 5/1998 | Rietkerk | |
| 5,748,084 A | 5/1998 | Isikoff | |
| 5,751,246 A | 5/1998 | Hertel | |
| 5,752,186 A | 5/1998 | Malackowski et al. | |
| 5,752,193 A | 5/1998 | Scholefield | |
| 5,752,195 A | 5/1998 | Tsuji | |
| 5,754,554 A | 5/1998 | Nakahara | |

| | | | | | |
|---|---|---|---|---|---|
| D395,250 S | 6/1998 | Kabler et al. | 6,031,489 A | 2/2000 | Wyrwas et al. |
| 5,761,204 A | 6/1998 | Grob et al. | 6,032,037 A | 2/2000 | Jeffers |
| 5,761,292 A | 6/1998 | Wagner | 6,038,310 A | 3/2000 | Hollywood et al. |
| 5,771,001 A | 6/1998 | Cobb | 6,038,595 A | 3/2000 | Ortony |
| 5,771,455 A | 6/1998 | Kennedy, III et al. | 6,041,124 A | 3/2000 | Sugita |
| 5,774,876 A | 6/1998 | Woolley et al. | 6,044,257 A | 3/2000 | Boling et al. |
| 5,781,156 A | 7/1998 | Krasner | 6,049,971 A | 4/2000 | Petit |
| 5,784,422 A | 7/1998 | Heermann | 6,055,434 A | 4/2000 | Seraj |
| 5,786,789 A | 7/1998 | Janky | 6,057,756 A | 5/2000 | Engellenner |
| 5,790,842 A | 8/1998 | Charles | 6,067,044 A | 5/2000 | Whelan et al. |
| 5,794,124 A | 8/1998 | Ito | 6,067,457 A | 5/2000 | Erickson et al. |
| 5,796,808 A | 8/1998 | Scott et al. | 6,069,570 A | 5/2000 | Herring |
| 5,797,091 A | 8/1998 | Clise et al. | 6,070,089 A | 5/2000 | Brophy et al. |
| 5,804,810 A | 9/1998 | Woolley et al. | 6,075,458 A | 6/2000 | Ladner et al. |
| 5,805,576 A | 9/1998 | Worley, III | 6,076,099 A | 6/2000 | Chen et al. |
| 5,812,087 A | 9/1998 | Krasner | 6,081,523 A | 6/2000 | Merchant |
| 5,812,522 A | 9/1998 | Lee | 6,091,969 A | 7/2000 | Brophy et al. |
| 5,815,114 A | 9/1998 | Speasl et al. | 6,097,760 A | 8/2000 | Spicer |
| RE35,916 E | 10/1998 | Dennison et al. | 6,101,395 A | 8/2000 | Keshavachar et al. |
| 5,825,283 A | 10/1998 | Camhi | 6,121,922 A | 9/2000 | Mohan |
| 5,825,327 A | 10/1998 | Krasner | 6,122,271 A | 9/2000 | McDonald |
| 5,826,188 A | 10/1998 | Tayloe | 6,122,514 A | 9/2000 | Spaur et al. |
| 5,831,574 A | 11/1998 | Krasner | 6,131,067 A | 10/2000 | Girerd et al. |
| 5,832,394 A | 11/1998 | Wortham | 6,131,366 A | 10/2000 | Fukuda |
| 5,835,907 A | 11/1998 | Newman | 6,133,874 A | 10/2000 | Krasner |
| 5,838,237 A | 11/1998 | Revell et al. | 6,140,956 A | 10/2000 | Hillman et al. |
| 5,841,396 A | 11/1998 | Krasner | 6,144,336 A | 11/2000 | Preston et al. |
| 5,841,842 A | 11/1998 | Baum | 6,151,493 A | 11/2000 | Sasakura et al. |
| 5,842,141 A | 11/1998 | Vaihoja | 6,154,658 A | 11/2000 | Caci |
| 5,850,392 A | 12/1998 | Wang | 6,166,688 A | 12/2000 | Cromer et al. |
| 5,856,986 A | 1/1999 | Sobey | 6,169,497 B1 | 1/2001 | Robert |
| 5,864,578 A | 1/1999 | Yuen | 6,173,194 B1 | 1/2001 | Vanttila |
| 5,864,763 A | 1/1999 | Leung et al. | 6,175,307 B1 | 1/2001 | Peterson |
| 5,870,675 A | 2/1999 | Tuutijarvi | 6,181,253 B1 | 1/2001 | Eschenbach et al. |
| 5,874,914 A | 2/1999 | Krasner | 6,195,736 B1 | 2/2001 | Lisle |
| 5,881,069 A | 3/1999 | Cannon | 6,208,959 B1 | 3/2001 | Jonsson |
| 5,881,373 A | 3/1999 | Elofsson | 6,212,207 B1 | 4/2001 | Nichols |
| 5,884,214 A | 3/1999 | Krasner | 6,226,529 B1 | 5/2001 | Bruno et al. |
| 5,886,634 A | 3/1999 | Muhme | 6,236,652 B1 | 5/2001 | Preston |
| 5,890,108 A | 3/1999 | Yeldener | 6,249,227 B1 | 6/2001 | Brady et al. |
| 5,892,441 A | 4/1999 | Wooley et al. | 6,266,008 B1 | 7/2001 | Huston et al. |
| 5,892,454 A | 4/1999 | Schipper et al. | 6,269,392 B1 | 7/2001 | Cotichini et al. |
| 5,901,179 A | 5/1999 | Urabe et al. | 6,272,315 B1 | 8/2001 | Chang et al. |
| 5,911,129 A | 6/1999 | Towell | 6,275,990 B1 | 8/2001 | Dapper et al. |
| 5,912,886 A | 6/1999 | Takahashi et al. | 6,282,430 B1 | 8/2001 | Young |
| 5,913,170 A | 6/1999 | Wortham | 6,288,645 B1 | 9/2001 | McCall et al. |
| 5,917,449 A | 6/1999 | Sanderford et al. | 6,295,461 B1 | 9/2001 | Palmer et al. |
| 5,918,180 A | 6/1999 | Dimino | 6,300,863 B1 | 10/2001 | Cotichini et al. |
| 5,930,340 A | 7/1999 | Bell | 6,300,875 B1 | 10/2001 | Schafer |
| 5,930,722 A | 7/1999 | Han et al. | 6,301,480 B1 | 10/2001 | Kennedy et al. |
| 5,933,468 A | 8/1999 | Kingdon | 6,304,186 B1 | 10/2001 | Rabanne et al. |
| 5,936,526 A | 8/1999 | Klein | 6,304,637 B1 | 10/2001 | Mirashrafi et al. |
| 5,937,355 A | 8/1999 | Joong et al. | 6,307,471 B1 | 10/2001 | Xydis |
| 5,940,598 A | 8/1999 | Strauss et al. | 6,308,060 B2 | 10/2001 | Wortham |
| 5,945,944 A | 8/1999 | Krasner | 6,320,535 B1 | 11/2001 | Hillman |
| 5,946,304 A | 8/1999 | Chapman et al. | 6,321,091 B1 | 11/2001 | Holland |
| 5,946,611 A | 8/1999 | Dennison et al. | 6,326,736 B1 | 12/2001 | Kang |
| 5,949,335 A | 9/1999 | Maynard | 6,327,533 B1 | 12/2001 | Chou |
| 5,953,694 A | 9/1999 | Pillekamp | 6,343,217 B1 | 1/2002 | Borland |
| 5,960,363 A | 9/1999 | Mizikovsky et al. | 6,345,251 B1 | 2/2002 | Jansson et al. |
| 5,961,608 A | 10/1999 | Onosaka | 6,351,495 B1 | 2/2002 | Tarraf |
| 5,963,130 A | 10/1999 | Schlager et al. | 6,358,145 B1 | 3/2002 | Wong |
| 5,963,134 A | 10/1999 | Bowers et al. | 6,359,923 B1 | 3/2002 | Agee |
| 5,970,130 A | 10/1999 | Katko | 6,362,736 B1 | 3/2002 | Gehlot |
| 5,978,676 A | 11/1999 | Guridi et al. | 6,373,842 B1 | 4/2002 | Coverdale |
| 5,991,279 A | 11/1999 | Haugli | 6,405,033 B1 | 6/2002 | Kennedy, III et al. |
| 5,999,124 A | 12/1999 | Sheynblat | 6,430,176 B1 | 8/2002 | Christie, IV |
| 5,999,126 A | 12/1999 | Ito | 6,434,198 B1 | 8/2002 | Tarraf |
| 6,002,363 A | 12/1999 | Krasner | 6,466,582 B2 | 10/2002 | Venters et al. |
| 6,006,189 A | 12/1999 | Strawczynski | 6,470,046 B1 | 10/2002 | Scott |
| 6,009,325 A | 12/1999 | Retzer | 6,477,633 B1 | 11/2002 | Grimmett |
| 6,009,338 A | 12/1999 | Iwata | 6,493,338 B1 | 12/2002 | Preston et al. |
| 6,011,973 A | 1/2000 | Valentine et al. | 6,516,198 B1 | 2/2003 | Tendler |
| 6,014,089 A | 1/2000 | Tracy et al. | 6,519,260 B1 | 2/2003 | Galyas |
| 6,014,090 A | 1/2000 | Rosen | 6,522,265 B1 | 2/2003 | Hillman |
| 6,014,376 A | 1/2000 | Abreu | 6,526,026 B1 | 2/2003 | Menon |
| 6,018,654 A | 1/2000 | Valentine | 6,529,744 B1 | 3/2003 | Birkler |
| 6,021,163 A | 2/2000 | Hoshi | 6,611,804 B1 | 8/2003 | Dorbecker et al. |
| 6,024,142 A | 2/2000 | Bates | 6,614,349 B1 | 9/2003 | Proctor et al. |

| | | |
|---|---|---|
| 6,617,979 B2 | 9/2003 | Yoshioka |
| 6,628,967 B1 | 9/2003 | Yue |
| 6,665,333 B2 | 12/2003 | McCrady |
| 6,677,894 B2 | 1/2004 | Sheynblat |
| 6,681,121 B1 | 1/2004 | Preston et al. |
| 6,683,855 B1 | 1/2004 | Bordogna |
| 6,690,681 B1 | 2/2004 | Preston et al. |
| 6,690,922 B1 | 2/2004 | Lindemann |
| 6,697,987 B2 * | 2/2004 | Lee |
| 6,700,867 B2 | 3/2004 | Classon |
| 6,747,571 B2 | 6/2004 | Fierro |
| 6,754,265 B1 * | 6/2004 | Lindemann |
| 6,771,629 B1 | 8/2004 | Preston et al. |
| 6,778,645 B1 | 8/2004 | Rao |
| 6,799,050 B1 | 9/2004 | Krasner |
| 6,836,515 B1 * | 12/2004 | Kay |
| 6,845,153 B2 | 1/2005 | Tiburtius |
| 6,917,449 B2 | 7/2005 | Nakajima et al. |
| 6,940,809 B2 | 9/2005 | Sun |
| 6,981,022 B2 | 12/2005 | Boundy |
| 6,993,362 B1 * | 1/2006 | Aberg |
| 7,092,370 B2 | 8/2006 | Jiang |
| 7,103,550 B2 | 9/2006 | Gallagher |
| 7,151,768 B2 | 12/2006 | Preston et al. |
| 7,164,662 B2 | 1/2007 | Preston et al. |
| 7,206,305 B2 | 4/2007 | Preston et al. |
| 7,206,574 B2 | 4/2007 | Bright |
| 7,215,965 B2 | 5/2007 | Fournier et al. |
| 7,221,669 B2 | 5/2007 | Preston et al. |
| 7,269,188 B2 | 9/2007 | Smith |
| 7,286,522 B2 | 10/2007 | Preston |
| 7,317,696 B2 | 1/2008 | Preston |
| 7,398,100 B2 | 7/2008 | Harris |
| 7,430,428 B2 | 9/2008 | Van Bosch |
| 7,477,906 B2 | 1/2009 | Radic |
| 7,483,418 B2 | 1/2009 | Maurer |
| 7,511,611 B2 | 3/2009 | Sabino |
| 7,512,098 B2 | 3/2009 | Jiang |
| 7,562,393 B2 | 7/2009 | Buddhikot |
| 7,593,449 B2 | 9/2009 | Shattil |
| 7,606,555 B2 | 10/2009 | Walsh |
| 2002/0093924 A1 | 7/2002 | Preston et al. |
| 2002/0093990 A1 | 7/2002 | Preston et al. |
| 2002/0111167 A1 * | 8/2002 | Nguyen |
| 2002/0122401 A1 * | 9/2002 | Xiang |
| 2003/0016639 A1 * | 1/2003 | Kransmo |
| 2003/0073406 A1 | 4/2003 | Benjamin |
| 2003/0147401 A1 | 8/2003 | Kyronaho |
| 2003/0227939 A1 | 12/2003 | Yukie |
| 2004/0034529 A1 * | 2/2004 | Hooper, III |
| 2004/0171370 A1 * | 9/2004 | Natarajan |
| 2004/0192345 A1 | 9/2004 | Osborn |
| 2004/0260542 A1 * | 12/2004 | Ananthapadmanabhan et al. ............ 704/219 |
| 2005/0031097 A1 | 2/2005 | Rabenko |
| 2005/0090225 A1 | 4/2005 | Muehleisen |
| 2005/0111563 A1 | 5/2005 | Tseng |
| 2005/0147057 A1 | 7/2005 | LaDue |
| 2005/0207511 A1 | 9/2005 | Madhavan |
| 2005/0215228 A1 | 9/2005 | Fostick |
| 2005/0226202 A1 | 10/2005 | Zhang |
| 2006/0171368 A1 | 8/2006 | Moinzadeh |
| 2006/0246910 A1 | 11/2006 | Petermann |
| 2007/0087756 A1 | 4/2007 | Hoffberg |
| 2007/0124625 A1 | 5/2007 | Hassan |
| 2007/0258398 A1 * | 11/2007 | Chesnutt et al. ............ 370/328 |
| 2007/0264964 A1 | 11/2007 | Birmingham |
| 2008/0025295 A1 | 1/2008 | Elliott |
| 2008/0056469 A1 | 3/2008 | Preston |
| 2008/0107094 A1 | 5/2008 | Borella |
| 2008/0132200 A1 | 6/2008 | Shinoda |
| 2008/0143497 A1 | 6/2008 | Wasson et al. |
| 2008/0266064 A1 | 10/2008 | Curran |
| 2009/0110033 A1 * | 4/2009 | Shattil ............ 375/141 |
| 2009/0265173 A1 * | 10/2009 | Madhavan et al. ............ 704/268 |
| 2009/0306976 A1 * | 12/2009 | Joetten et al. ............ 704/214 |
| 2010/0211660 A1 | 8/2010 | Kiss |

FOREIGN PATENT DOCUMENTS

| | | |
|---|---|---|
| DE | 44 24 412 A1 | 1/1996 |
| EP | 0 242 099 A2 | 10/1987 |
| EP | 0 528 090 A1 | 8/1991 |
| EP | 0 512 789 A2 | 5/1992 |
| EP | 0 501 058 A2 | 9/1992 |
| EP | 0 512 789 A2 | 11/1992 |
| EP | 0 545 753 A1 | 6/1993 |
| EP | 0 545 783 A1 | 6/1993 |
| EP | 0545783 | 6/1993 |
| EP | 0 580 397 A2 | 1/1994 |
| EP | 0889610 A2 | 1/1999 |
| EP | 0 545 783 B1 | 2/1999 |
| EP | 0 896 442 A1 | 2/1999 |
| EP | 1 843 503 A2 | 10/2007 |
| GB | 2 290 005 A | 5/1994 |
| JP | 03232349 | 10/1991 |
| JP | 5130008 | 5/1993 |
| JP | 5252099 | 9/1993 |
| JP | 6077887 | 3/1994 |
| JP | 11109062 | 4/1999 |
| WO | WO 89/12835 | 12/1989 |
| WO | WO 9107044 | 5/1991 |
| WO | WO 95/21511 | 8/1995 |
| WO | WO 96/07110 | 3/1996 |
| WO | WO 96/15636 | 5/1996 |
| WO | WO 96/18275 | 6/1996 |
| WO | WO 9834164 | 8/1998 |
| WO | WO 9834359 | 8/1998 |
| WO | WO 98/53573 | 11/1998 |
| WO | WO 98/59256 | 12/1998 |
| WO | WO 98/59257 | 12/1998 |
| WO | WO 99/14885 A2 | 3/1999 |
| WO | WO 99/36795 | 7/1999 |
| WO | WO 99/49677 | 9/1999 |
| WO | WO 99/56143 | 11/1999 |
| WO | WO 99/56144 | 11/1999 |
| WO | WO 00/11893 | 3/2000 |
| WO | WO 0178249 A1 | 10/2001 |
| WO | WO 0199295 A2 | 12/2001 |
| WO | WO 03034235 A1 | 4/2003 |
| WO | WO 03/081373 A2 | 10/2003 |
| WO | WO 2009/149356 A2 | 12/2009 |

OTHER PUBLICATIONS

Brown, et al., "A Reconfigurable Modem for Increased Network . . ." IEEE Trans. on Circuits & Systems for Video Technology, vol. 6, No. 2, Apr. 1996, pp. 215-224.

Thomas W. Christ, "A Prison Guard Duress Alarm Location System," Proceedings of the IEEE 1993 Intl Carnahan Conf. on Security Tech., Oct. 13-15, 1993, Copyright 1993 IEEE.

Coleman et al., Subjective Performance Evaluation of the RPE-LTP Codec for the Pan-European Cellular Digital Radio Sys. Nov. 27-30, 1989, pp. 758-761; 1075-1079, IEEE.

Office Action for U.S. Appl. No. 09/677,486, filed Oct. 2, 2000.

Feher, "MODEMS for Emerging Digital Cellular-Mobile Radio System," IEEE Trans. on Vehicular Technology, vol. 40, No. 2, May 1991, pp. 355-365.

Jani, et al., Potential Networking Applications of global Positioning Systems (GPS), downloadable at http://www.cis.ohio-state.edu/~jain/papers/gps.htm, pp. 1-40, Apr. 1996.

Janus Technologies, Inc., "ProxTrak Asset Tracking Interface," copyright 2000 Janus Tech., Inc. published at http://www.janus-tech.com/products/ProxTrax.html, printed May 2002.

RE Lavigne & P. Eng, "Trunking Versus Conventional Radio System," Proceedings of the IEEE, 34th Annual 2000 Int'l Carnahan Conf. Oct. 23-25, 2000.

Lin et al., "Data Compression of Voiceband Modem Signals," 40th IEEE Vehicular Tech. Conf.: On the Move in the 90s. May 6-9, 1990, pp. 323-325, IEEE New York, NY.

Lockwood Tech. Corp., "Asset Management," Copyright 2002 by Lockwood Tech. Corp. published at http://www.lockwoodtechnology.com/asset_tracking.html, May 29, 2002.

Brian W. Martin, "Watchlt: A Fully Sipervised Identification, Location and Tracking Sys." IEEE, 29th Annual 1995 Int'l Carnahan Conf. on Security Tech. Oct. 1995.

Shawn McNichols, "Keeping Your Assets Safe," published at http://www.securitymagazine.com/CDA/ArticleInformation/features/BNP_Features, posted Feb. 14, 2002.
Mueller et al., "A DSP Implemented Dual 9600/7200 BPS TCM Modem for Mobile Communications Over FM Voice Radio," 1997 IEEE Pac Rim Conf., vol. 2, Aug. 20-22, 1997, p. 758-761.
Lisa A. Phifer, Surfing the Web Over Wireless, Jan. 1998, http://www.coreome.com/html/wireless.html, printed May 22, 2007.
Anton B. Reut, "Remote Monitoring of Military Assets Using Commercial Leo Satellites," IEEE universal Communications Conf. Record, Nov. 6-8, 1995, Copyright 1995 IEEE.
Jay Werb & Colin Lanzl, "Designing a Positioning System for Finding Things and People Indoors," IEEE Spectrum, Sep. 1998.
Jay Werb & Colin Lanzl, "The Next Generation of Control: Local Positioning," Abstract, Feb. 1999, vol. 26.
"Tracking," published at http://www.wisetrack.com/tacking/html, posted May 29, 2002, Copyright 2001 by TVL, Inc.
Office Action for U.S. Appl. No. 09/625,159, mailed Apr. 9, 2003, 15 pages.
European Search Report dated Dec. 22, 2004 for EP01950402, 5 pages.
International Search Report, PCT/US00/01157, May 23, 2000, 5 pages.
PCT International Search Report dated Nov. 27, 2000 for International Application No. PCT/US00/13288.
International Search Report, PCT/US01/19845, Nov. 22, 2001, 5 pages.
PCT International Search Report dated Jan. 3, 2002 for International Application No. PCT/US01/20021.
International Search Report, PCT/US01/27238, Feb. 13, 2002, 3 pages.
PCT/US02/00330, Jul. 11, 2002, Airbiquity, Inc.
PCT International Search Report dated Jun. 24, 2002, for International Application No. PCT/US02/00996.
PCT/US2009/056834 International Search Report and Written Opinion dated Dec. 30, 2009; 12 pages.
PCT International Search Report dated Nov. 27, 2000 for International Application No. PCT/US00/13288.
3GPP2 Access Network Interfaces Technical Specification Group, "3GGP2 Access Network Interfaces TSG (TSG-A) #60, Meeting Summary," Coeur d'Alene, Idaho, Apr. 19, 2004, pp. 1-5.
Digital Cellular Telecommunications System (Phase 2+); GSM 06.31 version 8.0.1 Release 1999. ETSI EN 300 964 V8.01 (Nov. 2000), pp. 1-13. European Standard (Telecommunications serier). (http://www.etsi.org).

International Search Report and Written Opinion of International Application No. PCT/US07/64443, dated Sep. 15, 2008.
International Search Report for PCT/US06/03416, dated Feb. 5, 2007, 3 pages.
Janus Technologies, Inc., "ProxTrak Asset Tracking Interface," copyright 2000 Janus Technologies, Inc., published on the Internet at http://www.janus-tech.com/Products/ProxTrax.html, printed May 29, 2002.
U.S. Appl. No. 60/047,034; dated May 19, 1997; Applicant: Preston.
U.S. Appl. No. 60/047,140; dated May 20, 1997; Applicant: Preston.
U.S. Appl. No. 60/048,369; dated Jun. 3, 1997; Applicant: Preston.
U.S. Appl. No. 60/048,385; dated Jun. 3, 1997; Applicant: Preston.
U.S. Appl. No. 60/055,497; dated Aug. 13, 1997; Applicant: Preston.
Universal Mobile Telecommunications System (UMTS); Push Architecture (3GPP TR 23.976 version 6.1.0 Release 6); Jun. 2004; 36 pages.
USPTO Search Authority; PCT/US08/80555 International Search Report; Dec. 19, 2008, 11 pages.
Vaha-Sipila, A., URLs for Telephone Calls, Request for Comments: 2806, Network Working Group, Apr. 2000, 16 pages.
VOCAL Technologies, Ltd. Home Page, "Audio Codecs," http://www.vocal.com/data_sheets/audio_codecs.html?glad, accessed Jun. 12, 2005.
Written Opinion of the International Searching Authority for PCT/US06/03416, dated Feb. 5, 2007, 3 pages.
3rd Generation Partnership Project; Technical Specification Group Services and System Aspects Push Architecture (Rel. 6); 3GPP TR 23.976; vol. 3-SA2, No. V6.1.0; Jun. 1, 2004; pp. 1-34.
International Preliminary Report on Patentability in PCT/US2006/022985 dated Jan. 3, 2008; 6 pages.
Ayanoglu, E., "Adaptive ARQ/FEC for Multitone Transmission in Wireless Networks" Global Telecommunications Conference, 1995. Conference Record. Communication Theory Mini-Conference, Globecom '95., IEEE Singapore Nov. 13-17, 1995, New York, NY, USA, IEEE, US Lnkd. vol. 3. Whole Document.
Lemke A. C., et al.: "Voice Over Data and Data Over Voice: Evolution of the Alcatel 1000. Seamless Evolution of the Alcatel 1000 Switching System will Support the Move to Voice and Data Convergence." Electrical Communication, Alcatel. Brussels, BE, Apr. 1, 1999. Abstract; Figure 2.
Benelli G., et al.: "A Coding and Retransmission Protocol for Mobile Radio Data Transmission." Vehicular Technology Conference, 1999. VTC 1999—Fall. IEEE VTS 50th Amsterdam Netherlands Sep. 19-22, 1999. Abstract Section II.

* cited by examiner

METHODS FOR IN-BAND SIGNALING THROUGH ENHANCED VARIABLE-RATE CODECS

RELATED APPLICATIONS

This application claims priority to U.S. Provisional Patent Application No. 61/097,177 entitled "Signal Design for Low-Bit Rate EVRC-B" filed on Sep. 15, 2008, as well as to U.S. Provisional Patent Application No. 61/101,880 entitled "Tapered Narrow-band Data Signaling Method, System and Software for Enhanced Variable-rate Codec Compatibility in In-Band Signaling" filed on Oct. 1, 2008, the disclosures of which are incorporated herein by reference in their entirety.

COPYRIGHT NOTICE

©2008 AIRBIQUITY INC. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

Wireless communications, including methods for in-band signaling of small amounts of data through a voice channel session of a digital wireless telecommunications system.

BACKGROUND

Many telecommunication components used in cellular and landline telephone networks are designed to efficiently transmit human voice signals over voice communication channels. For example, a digital voice coder (vocoder) uses linear predictive coding techniques to represent sampled voice signals in compressed form. These linear predictive coders filter out noise (non-voice signals) while compressing and estimating the frequency components of the voice signals before being transmitted over the voice channel.

It is sometimes desirable to transmit both audio signals and digital data over a wireless telecommunications network. For example, when a cellular telephone user calls "911" for emergency assistance, the user may wish to send digital location data to a call center over the same channel used to verbally explain the emergency conditions to a human operator. However, it can be difficult to transmit digital data signals over the voice channel of a wireless network because such signals are subject to several types of distortion. For example, encoded data signals traveling over the voice channel of a wireless network can be distorted by vocoder effects caused by the voice compression algorithm.

The need remains for improvements in data communications via the voice channel of a digital wireless telecommunications network. Voice channels are preferred for some applications, especially emergency applications, because wireless voice services, as distinguished from data services, are highly reliable, minimize delay, and are widely available in many geographic areas around the world.

Related information can be found in U.S. Pat. No. 6,144,336 incorporated herein by this reference. Additional disclosure can be found in U.S. Pat. No. 6,690,681 also incorporated by reference. And finally, further relevant disclosure appears in U.S. Pat. No. 6,493,338 also incorporated by reference as though fully set forth. The foregoing patents are owned by the assignee of the present application.

DETAILED DESCRIPTION OF PREFERRED EMBODIMENTS

A family of narrow-band signaling methods is disclosed to successfully pass data-carrying signals through the low-bit rate modes of the EVRC-B vocoder commonly used in CDMA wireless channels. Narrow-band signals, or tones, above 2 kHz experience significant distortion by this processing chain, which results in poor detection performance in data transfer over the voice channel (called "in-band signaling") of the digital wireless network.

In one example consistent with the present invention, a narrow-band signal can be created to pass through known cellular network and EVRC-B processing and be successfully detected by a tone detector. Assuming that we have a system designed to detect a signal of given or predetermined frequency, we create the desired signal with an envelope that is tapered at both ends (see FIG. 1). We have discovered that this has the effect of stimulating the vocoder to represent the signal at higher bit rates that would otherwise occur. Consequently, the signal will be a more accurate representation of the original signal and be more readily detected by the receiver. By way of example, a preferred embodiment is described below.

Figure 1:
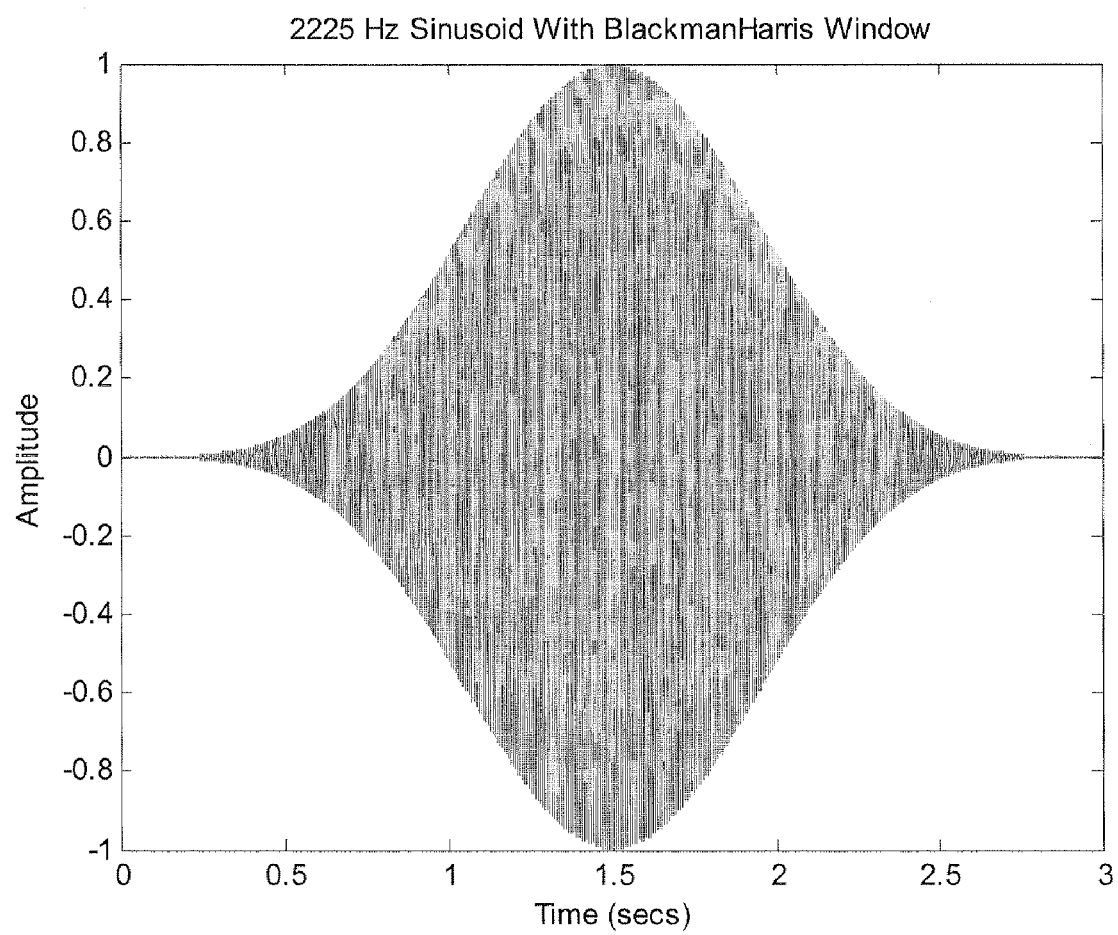
FIG. 1 is a plot of a 2225 Hz sinusoid with a Blackman-Harris window for transmission of data in a voice channel of a digital wireless telecommunications system.

In this example, the signal of interest is a 3 second 2225 Hz tone, and is created as a simple sinusoid multiplied by a windowing function as shown in FIG. 1. In this example, the Blackman-Harris window function is used, although there are other well-known windowing functions that could be used; e.g., Hamming, Parzen, Gaussian, Bartlett, Kaiser, etc. In addition to minimizing distortion by the EVRC-B network, another advantage of this waveform is that legacy detectors designed to detect the 2225 Hz tone will detect this new waveform as well. Thus this improved waveform can be used to advantage to signal a receiving modem, for example to prepare it to receive subsequent data to follow in the voice channel. The waveforms disclosed herein can also be used to prepare the transmission side coder or vocoder in advance of sending data encoded as audio frequency tones.

Once the design parameters of this waveform, such as its duration, frequency, and windowing function, are determined the waveform can be generated using a general programming language such as C, or with a signal processing software package such as Matlab. Both are commercially available. The digital samples of the waveform can then be stored in memory of the in-band signaling device, and retrieved whenever necessary for operation. Alternatively, the design parameters can be stored in memory of the in-band signaling device and the waveform generated 'on-the-fly' using these parameters whenever necessary.

These methods may be applied to various in-band signaling devices. For example, an in-band "modem" may be implemented in software stored and executed in a cell phone. It may execute using the cell phone processor and or DSP device. Other implementations of an in-band modem may be fashioned, for example, in a motor vehicle. In such cases, the modem may be coupled to an on-board network of the motor vehicle for integration with other systems. For example, an air bag deployment or other emergency signal (fire, engine explosion, etc) detected in the vehicle systems may be used to trigger the modem to initiate a call automatically to an emergency call taker.

Digital Processor and Associated Memory

The invention in some embodiments may be implemented, as noted, by a digital computing system. By the term digital computing system we mean any system that includes at least one digital processor and associated memory, wherein the digital processor can execute instructions or "code" stored in that memory. (The memory may store data as well.) A digital processor includes but is not limited to a microprocessor, multi-core processor, DSP (digital signal processor), vocoder, processor array, network processor, etc. A digital processor may be part of a larger device such as a laptop or desktop computer, a PDA, cell phone, iPhone PDA, Blackberry® PDA/phone, or indeed virtually any electronic device.

The associated memory, further explained below, may be integrated together with the processor, for example RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" in that they are readable by a suitable digital processor as is well known.

Storage of Computer Programs

As explained above, the present invention preferably is implemented or embodied in computer software (also known as a "computer program" or "code"; we use these terms interchangeably). Programs, or code, are most useful when stored in a digital memory that can be read by a digital processor.[1] We use the term "computer-readable storage medium" (or alternatively, "machine-readable storage medium") to include all of the foregoing types of memory, as well as new technologies that may arise in the future, as long as they are capable of storing digital information in the nature of a computer program or other data, at least temporarily, in such a manner that the stored information can be "read" by an appropriate digital processor. By the term "computer-readable" we do not intend to limit the phrase to the historical usage of "computer" to imply a complete mainframe, minicomputer, desktop or even laptop computer. Rather, we use the term to mean that the storage medium is readable by a digital processor or any digital computing system. Such media may be any available media that is locally and/or remotely accessible by a computer or processor, and it includes both volatile and non-volatile media, removable and non-removable media.

[1] In some cases, for example a simple text document or "flat file," a digital computing system may be able to "read" the file only in the sense of moving it, copying it, deleting it, emailing it, scanning it for viruses, etc. In other words, the file may not be executable on that particular computing system (although it may be executable on a different processor or computing system or platform.

Computer Program Product

Where a program has been stored in a computer-readable storage medium, we may refer to that storage medium as a computer program product. For example, a portable digital storage medium may be used as a convenient means to store and transport (deliver, buy, sell, license) a computer program. This was often done in the past for retail point-of-sale delivery of packaged ("shrink wrapped") programs.

Examples of such storage media include without limitation CD-ROM and the like. Such a CD-ROM, containing a stored computer program, is an example of a computer program product.

The present invention thus includes in-band signaling circuits and software configured to generate and or transmit waveforms of the types described herein. Conversely, at the receiving end, detectors and decoders may be employed for decoding data transmitted using such waveforms. In some embodiments, the waveforms are backward compatible for detection and decoding by legacy equipment.

In some embodiments, a waveform of the type disclosed above may be used in combination with another tone or waveform to provide in-band modem signaling capability for wireless networks that employ multiple types of vocoders. An in-band modem may use a particular signaling waveform that operates in one type of vocoder channel, but not in another. Such a scenario arises when voice vocoders in the network are upgraded, as when EVRC-B vocoders are introduced to CDMA wireless networks and co-exist with legacy EVRC vocoders. Unlike EVRC, the EVRC-B voice codec channel is not transparent to signals over 2 kHz, and will suppress signals greater than 2 kHz that were developed for EVRC channels. In-band modems can use an EVRC compatible waveform in tandem with one that is compatible with EVRC-B to ensure operation in such a wireless network. Alternatively the combination may consist of one waveform that is detectable in both vocoder channels, and one that is compatible in only one vocoder channel.

Figure 2:
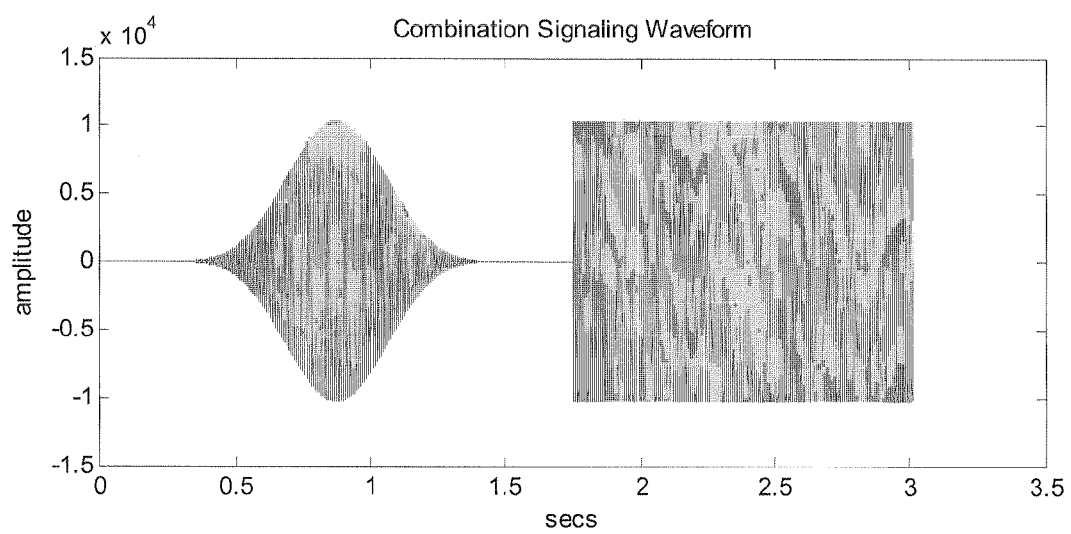
FIG. 2 is a plot illustrating an example of a combination signaling waveform for transmission of data in a voice channel of a digital wireless telecommunications system.

Another preferred embodiment employs the aforementioned tapered signaling waveform in tandem with another waveform using FSK-modulation. The tapered, or windowed, waveform is detectable in both EVRC and EVRC-B channels and the FSK-modulated signal is intended for use in the EVRC-B channel. Such a waveform combination results in improved performance in the EVRC-B channel because there are 2 waveforms that can be detected, and supports in-band modems that operate in EVRC channels. An example of this tandem waveform is shown in FIG. 2, in which a 2225 Hz windowed tone is followed by an FSK-modulated waveform.

It will be apparent to those having skill in the art that many changes may be made to the details of the above-described embodiments without departing from the underlying principles of the invention. The scope of the present invention should, therefore, be determined only by the following claims.

The invention claimed is:

1. An in-band signaling modem for use in a digital wireless telecommunications device to send input data over a voice channel of a digital wireless telecommunications network, the in-band signaling modem comprising:

software stored in a memory in the wireless telecommunications device, the software executable in a processor in the wireless telecommunications device;

the software configured to control the processor to generate a predetermined first signaling waveform for transmission over the voice channel, the first signaling waveform having a frequency within a range of approximately 400-3400 Hz;

wherein the first signaling waveform is tapered at the beginning of the first signaling waveform, such that it gradually increases in amplitude from substantially zero amplitude to a predetermined peak amplitude, for reducing distortion of the first signaling waveform by a transmission-side vocoder in the voice channel;

the software further configured to input the first signaling waveform to the transmission-side vocoder to prepare the transmission-side vocoder for processing audio frequency tones that encode the input data prior to sending the input data over the voice channel;

wherein the first signaling waveform is tapered at the end of the first signaling waveform, such that it gradually decreases in amplitude from the peak amplitude to substantially zero amplitude; and the first signaling waveform has a duration within a range of approximately 1-3 seconds; and wherein the software is further configured to control the processor to generate a combination signaling waveform for transmission over said voice channel, the combination signaling waveform comprising the first signaling waveform and a second signaling waveform, the second signaling waveform characterized by FSK (frequency shift keying) modulation of two audio frequencies; and the first and the second signaling waveforms are transmitted in tandem.

2. An in-band signaling modem according to claim 1 wherein the first signaling waveform is generated by applying a selected one of the Hamming, Parzen, Gaussian, Bartlett, and Kaiser window functions.

3. A computer-readable, non-transitory storage media storing executable code for use in a digital wireless telecommunications device to send data over a voice channel of a digital wireless telecommunications network, wherein the code is executable on a processor in the digital wireless telecommunications device;

wherein the code is configured to generate a combination signaling waveform for transmission prior to transmitting the data over the voice channel, the combination signaling waveform selected to reduce distortion in a vocoder;

wherein the combination signaling waveform includes at least two different bursts in tandem, each burst having a duration of at least approximately 1.0 second, and at least one of the bursts comprising a substantially sinusoidal waveform having a frequency greater than approximately 2 kHz and tapered at the beginning of the waveform from substantially zero amplitude to a predetermined peak amplitude;

wherein the code is configured to generate the combination signaling waveform having a total duration of at least approximately three seconds; and wherein a second burst waveform of the at least two different bursts is characterized by FSK (frequency shift keying) modulation of two audio frequencies, and the second burst either precedes or follows the first burst.

4. A method for adapting a first audio frequency waveform to traverse a vocoder in a voice channel of a digital wireless telecommunication system with reduced distortion, the method comprising:

generating said first audio frequency waveform;

extending the duration of the first audio frequency waveform to a selected duration within a range of approximately 1-3 seconds;

applying a windowing function to the first audio frequency waveform so as to taper leading and trailing ends of the first audio frequency waveform to form a shaped waveform;

inputting the shaped waveform for reducing distortion in vocoders that may be encountered when subsequently transmitting audio frequency tones that encode data in the voice channel of said digital wireless telecommunication system; and generating a second waveform for transmission in tandem with the first waveform;

wherein the second waveform is characterized by FSK (frequency shift keying) modulation of two audio frequencies.

5. The method of claim 4 wherein the windowing function is selected from the group consisting of the Hamming, Parzen, Gaussian, Bartlett, and Kaiser window functions.

6. A method for communicating digital input data over a voice channel of a digital wireless telecommunications network comprising:

receiving the digital input data;

encoding the input data into audio frequency tones for transmission via the voice channel;

generating a signaling waveform, the signaling waveform having an envelope that is tapered at both ends;

inputting the signaling waveform to a transmission side vocoder to prepare the transmission side vocoder for processing the audio frequency tones that encode the input data;

transmitting the signaling waveform over the voice channel;

and then transmitting the audio frequency tones that encode the input data over the voice channel;

wherein the signaling waveform comprises at least two different bursts in tandem, each burst having a duration of at least approximately 1.0 second, and at least one of the bursts comprising an audio frequency waveform that is tapered at the beginning of the waveform, such that it gradually increases in amplitude from substantially zero amplitude to a predetermined peak amplitude, for reducing distortion of the signaling waveform by said transmission side vocoder; and wherein a first burst of the at least two different bursts is tapered and a second burst waveform of the at least two different bursts is characterized by FSK (frequency shift keying) modulation of two audio frequencies.

* * * * *